United States Patent [19]

Maitland

[11] Patent Number: 4,533,151
[45] Date of Patent: Aug. 6, 1985

[54] COMBINATION CARRIER, CHAIR, AND LOUNGE/TABLE

[76] Inventor: Robert L. Maitland, R.F.D. #1, Lebanon, Conn. 06249

[21] Appl. No.: 488,142

[22] Filed: Apr. 25, 1983

[51] Int. Cl.³ .............................................. B62B 1/02
[52] U.S. Cl. .................... 280/47.25; 280/20; 280/30; 280/8; 297/118; 297/130; 297/DIG. 4
[58] Field of Search ............... 280/20, 23, 30, 8, 13, 280/47.18, 47.17, 47.25, 63; 297/130, 119, 118, DIG. 4

[56] References Cited

U.S. PATENT DOCUMENTS

| | | | |
|---|---|---|---|
| 2,065,233 | 12/1936 | Mallett | 280/47.25 |
| 3,046,031 | 7/1962 | Reynolds | 280/12 R |
| 3,504,921 | 4/1970 | Osmond | 280/8 |
| 3,822,422 | 7/1974 | Buntyn | 297/118 |
| 4,323,260 | 4/1982 | Suchy | 280/47.25 |
| 4,392,685 | 7/1983 | Leonhart | 297/119 |

*Primary Examiner*—Richard A. Bertsch
*Attorney, Agent, or Firm*—Robert Scobey

[57] ABSTRACT

A combination carrier, chair, and lounge/table assembly is disclosed formed from two frames having portions thereof that extend out of the planes of the frames. The frames are pivotable through 180° from a collapsed position to a fully opened position. The frames may be maintained in an intermediate approximately 120° spaced position by a strut joining the two frames. The strut is releasable with respect to one of the frames to serve as a pulling handle for the carrier, which includes wheels and skids.

17 Claims, 8 Drawing Figures

COMBINATION CARRIER, CHAIR, AND LOUNGE/TABLE

BACKGROUND AND BRIEF DESCRIPTION OF THE INVENTION

This invention provides a combination carrier, chair, and lounge/table useful particularly at the beach. It is formed from simple frames which are pivotally coupled one to the other, together with wheels and skids to permit the assembly to be pulled over the hard ground or soft sand, and a strut which serves the dual function as a pulling handle and a connection member for holding the two frames in a predetermined angular position so that they may serve as a chair. In use, the frames may be pivoted from a collapsed position, suitable for movement over the ground, to a fully opened position serving as a lounge or table, and at an intermediate angular position serving as a beach chair.

Pivotable frameworks are known for providing combination items as in the present invention. However, in the past, most have been made in a relatively complicated way, and none is believed to involve the two simple parallel side pieces and side members that are joined by a transverse cross piece and a transverse cross member, each of which extends out of the plane defined by the parallel side pieces and side members. Additionally, none is believed to involve use of a strut/handle assembly, so that a supporting strut in the chair may also be used as a pulling handle for the entire assembly. Further, skids are utilized, in addition to wheels, for moving the assembly over soft beach sand, for example, and also provide a mechanism for balancing the assembly in combination with one of the transverse frame pieces.

Representative prior art patents are as follows:

|   | Applicant | Issue Date |
|---|---|---|
| U.S. Pat. No. |   |   |
| 1,394,493 | Grazer | 10/18/21 |
| 1,416,018 | Hall | 05/16/22 |
| 2,394,245 | Koller | 02/05/46 |
| 2,840,142 | Sands | 06/24/58 |
| 3,046,031 | Reynolds | 07/24/62 |
| 3,285,654 | Cramer | 11/15/66 |
| 3,504,921 | Osmond | 04/07/70 |
| 3,580,592 | Schrecengost | 05/25/71 |
| 3,758,128 | Stenwall | 09/11/73 |
| 3,927,894 | Zawislak | 12/23/75 |
| German Patent No. |   |   |
| 1,937,263 | Armin Wachenfeld KG | 02/18/71 |

The invention will be more completely understood by reference to the following detailed description, taken in conjunction with the appended drawings.

DETAILED DESCRIPTION

Figure 1:
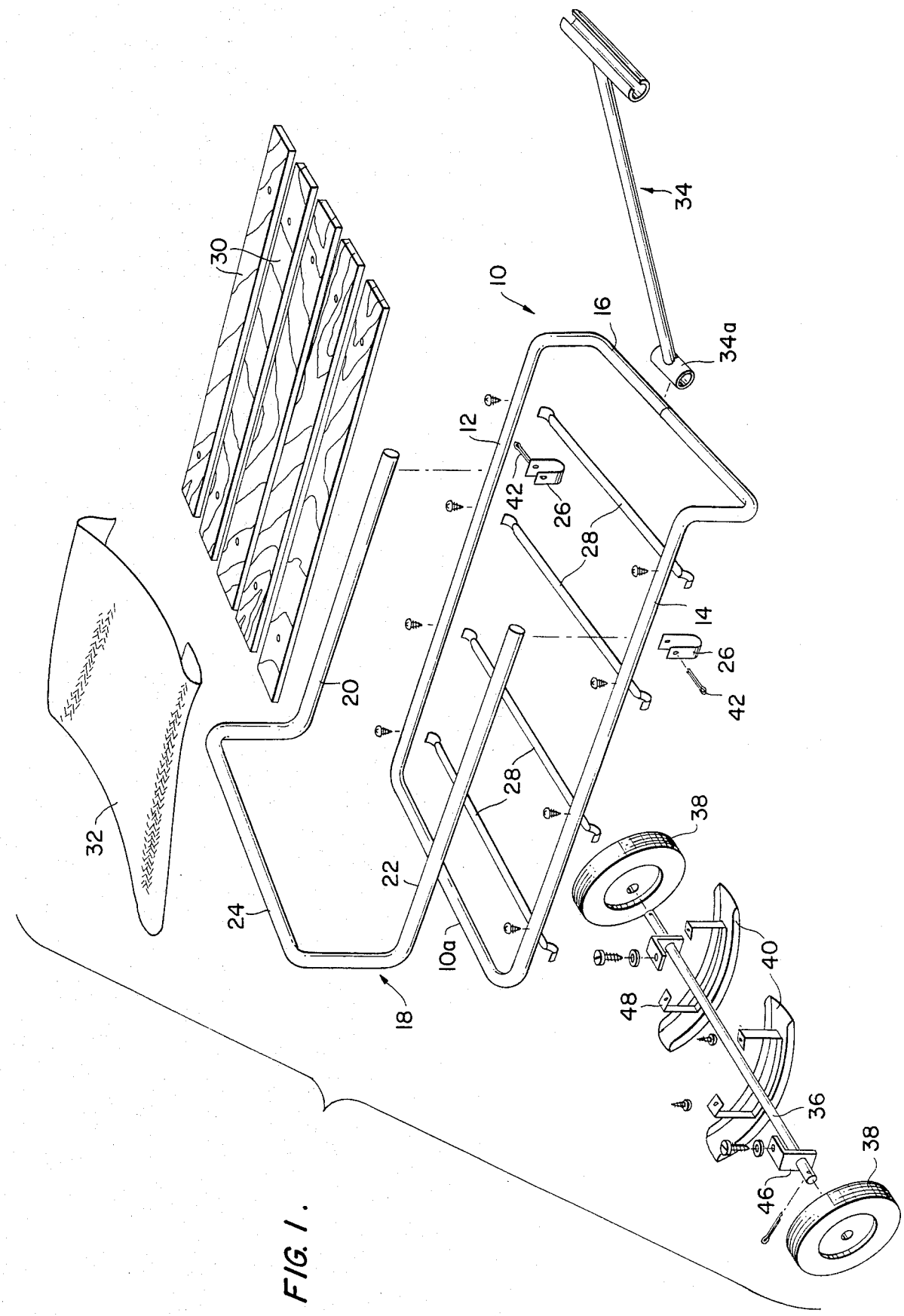
FIG. 1 is an exploded view of a combination carrier, chair, and lounge/table embodying the invention.

Referring to FIG. 1, an assembly for forming a combination carrier, chair, and lounge/table is shown. The assembly includes a first frame 10 that includes two parallel side pieces 12 and 14 that are joined by a transverse cross piece 16 that extends out of the plane defined by the side pieces 12 and 14. In particular, the transverse cross piece 16 is generally U-shaped, as will be noted from FIG. 1. A second frame 18 is utilized, that includes a pair of parallel side members 20 and 22, joined together by a transverse cross member 24 that extends out of the plane defined by the two parallel side members 20 and 22. As shown in FIG. 1, the transverse cross member 24 is also generally U-shaped. Clips 26 are utilized, attached to side pieces 12 and 14 so as to pivotally connect the side members 20 and 22 (of the frame 18) respectively to the side pieces 12 and 14 (of the frame 10). The action of the pivotal connection will be explained in more detail below, particularly with reference to FIGS. 2 to 4.

Still with reference to FIG. 1, transverse supports 28 are included, bridging the side pieces 12 and 14 of the frame 10, used to support slats 30. A sheet 32 of flexible material, such as canvas, spans the side members 20 and 22 of the frame 18, and is used as a back support, to be described in more detail below. A pulling handle/support strut 34 is also included, to be described below. An axle 36, together with wheels 38 and skids 40 complete the assembly whose parts are shown in exploded view in FIG. 1.

Figure 2:
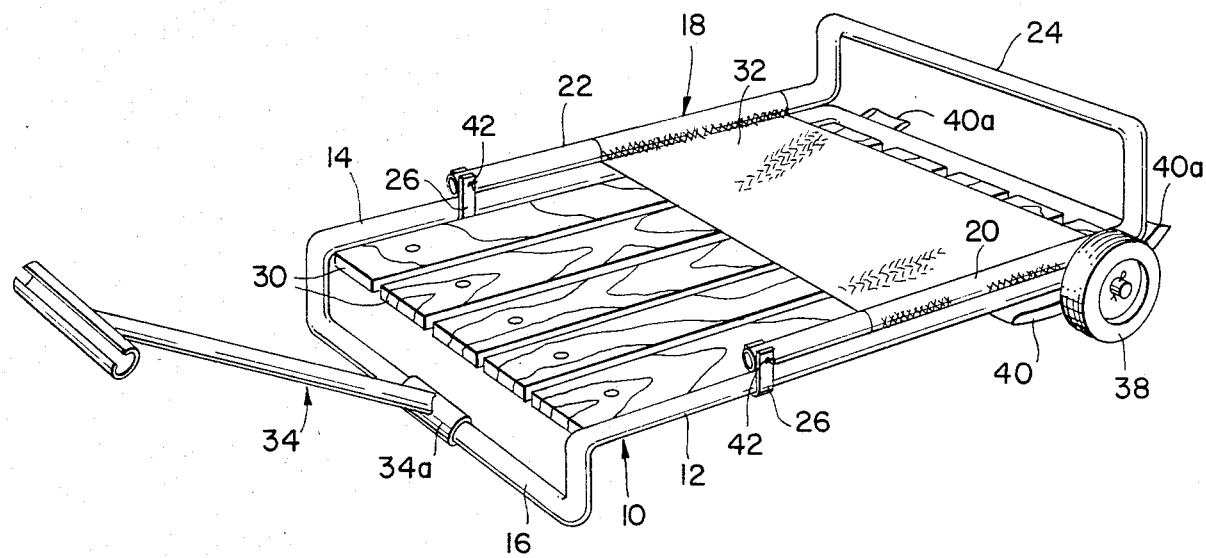
FIG. 2 is a perspective view of an assembled assembly as in FIG. 1, in collapsed form suitable for being pulled over the ground.
Figure 3:
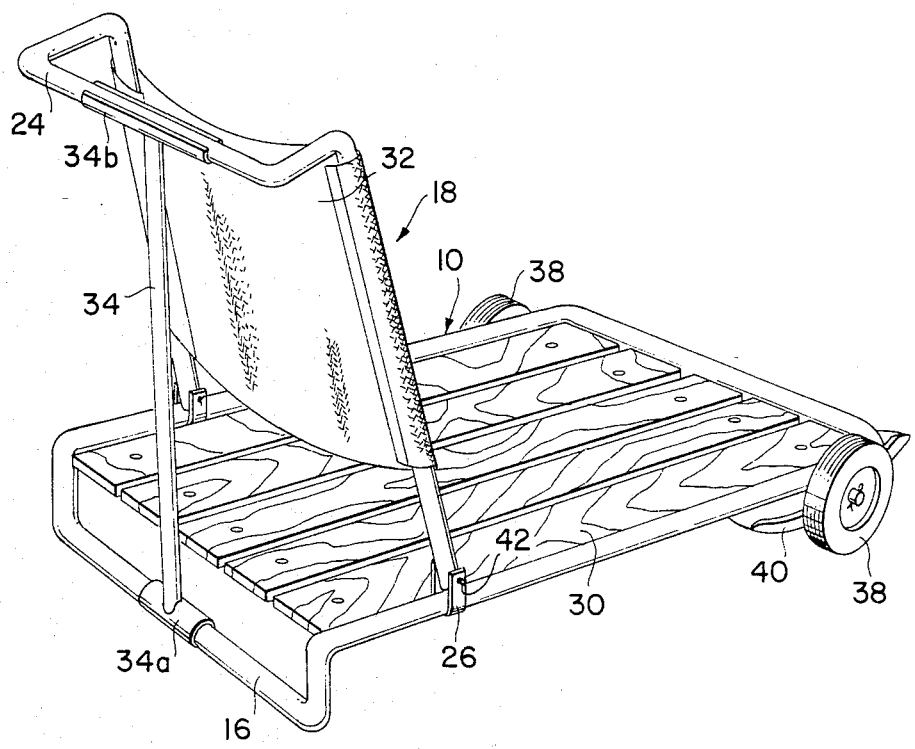
FIG. 3 is a perspective view of the assembly of FIG. 2, shown in erected chair form.

Turning to FIG. 2, the assembled parts of FIG. 1 are shown in collapsed condition. The handle/support strut 34 is pivotally coupled to the transverse cross piece 16 by coupling portion 34a, which may be partly tubular and "snapped" onto the cross piece 16 with sufficient force so that it is essentially permanently mounted for pivotal movement about that cross piece. In the "collapsed" form of the assembly, as shown in FIG. 2, the frames 10 and 18 lie in a first position adjacent one another, with the transverse cross piece 16 and transverse cross member 24 extending in opposed directions. In other words, the transverse cross piece 16 extends downwardly, while the transverse cross member extends upwardly. By use of the clips 26 and appropriate pins, such as cotter pins 42 (see also FIG. 1), the frame 18 may be pivoted from the collapsed condition of FIG. 2 to the condition of FIG. 3. In FIG. 3, the frames 10 and 18 are oriented at an angle of approximately 120° with respect to each other. In this condition of the assembly, the two frames are maintained in this angular relationship by virtue of the handle/support strut 34, which includes at its upper end a partially tubular member 34b which cradles and supports the transverse cross member 24 of the frame 18. In this condition of the assembly, a chair is formed, with a back support provided by the flexible material 32 and a seat by the slats 30.

Figure 4:
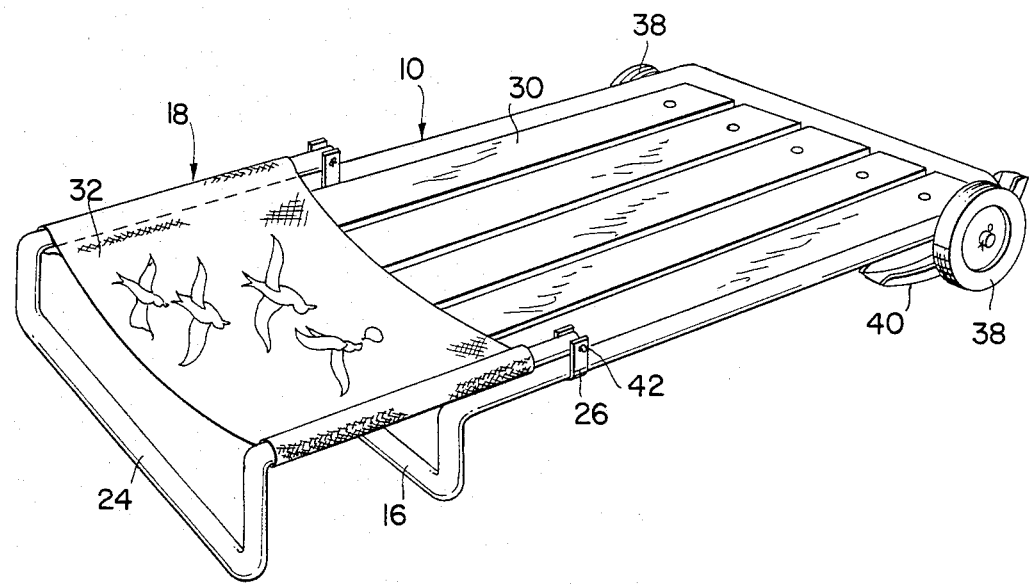
FIG. 4 is a perspective view of the assembly of FIG. 2, shown in erected lounge or table form.
Figure 5:
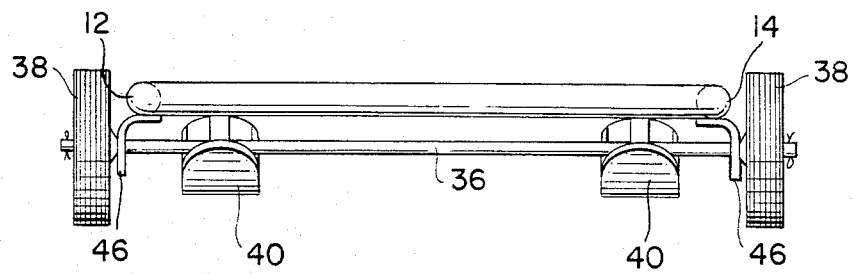
FIG. 5 is a front end view of the assembly of FIG. 2.
Figure 6:
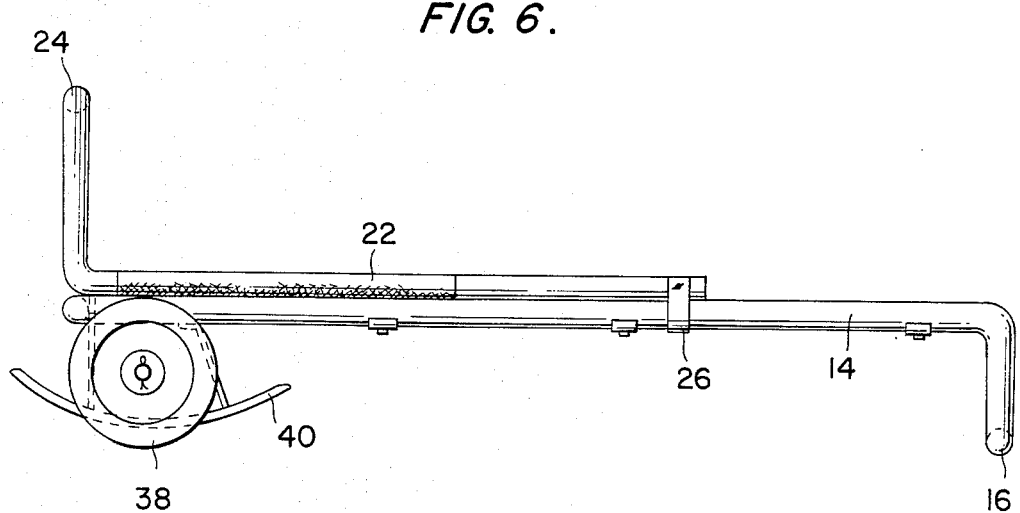
FIG. 6 is a left side view of the assembly of FIG. 2.
Figure 7:
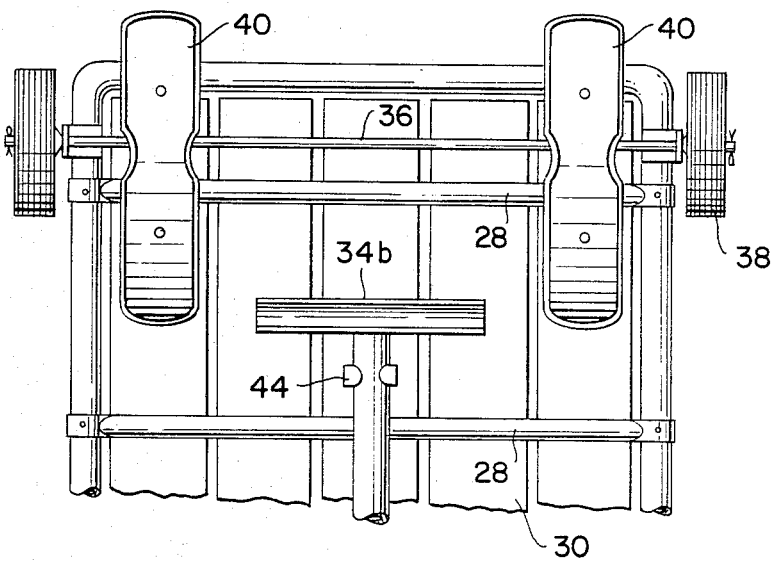
FIG. 7 is a partial bottom view of the front part of the assembly of FIG. 2.
Figure 8:
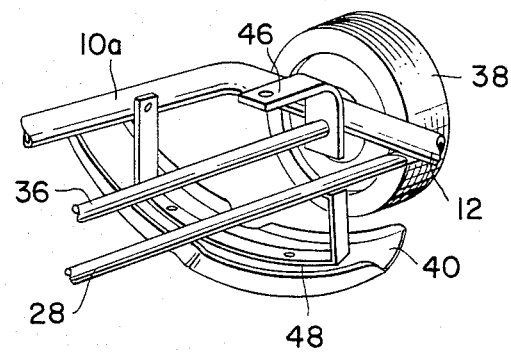
FIG. 8 is a perspective view of a part of the assembly of FIG. 2, showing the details of the skid and wheel attachment.

The frame 18 may be pivoted further by 180° from the collapsed condition of FIG. 2 to assume the condition of FIG. 4. In this condition, the assembly may serve as a table or a lounge. The transverse cross piece 16 and the transverse cross member 24 of the respective frames 10 and 18 now extend in the same direction (downwardly) and serve as ground supports for the assembly at one end thereof; the wheels 38 provide ground support at the other end of the assembly. It should be noted that, to pivot the frame 18 from the condition shown in FIG. 3 to that shown in FIG. 4, the handle/support strut 34 is disengaged from the transverse cross member 24, and may be pivoted about the transverse cross piece 16 to a position underneath the slats 30, to be held in that position by a clip 44 secured to the underside of the center one of the slats 30, as shown in FIG. 7.

FIGS. 5 to 8 show the details of the mounting of the wheels 38 and skids 40 to the assembly. In particular, axle 36 may be mounted in place by right-angled clips 46 which may be secured to side pieces 12 and 14 of the frame 10. The skids 40 may be secured in place by brackets 48 that are fastened both to the skids and to an end section 10a of the frame 10 and one of the slat supports 28.

In summary, a unique assembly has been provided that may serve as a carrier, when in the condition shown in FIG. 2. The transverse cross member 24 may serve to hold items on the carrier; the assembly may be easily pulled along by use of the handle/support strut 34 which, in this case, serves as a pulling handle. When being pulled over firm ground, the wheels 38 are utilized. To pull the assembly over sand, for example, the skids may be used, in which case the assembly is tilted, and the assembly then rides on the skids 40 and the wheels 38. As will be noted from FIG. 2, the skids 40 include ends 40a that protrude beyond the end of the assembly (past the plane defined by the transverse cross member 24). Thus, the assembly as shown in FIG. 2 may be pivoted so that it is vertical (rather than horizontal as shown), and the skid ends 40a may extend into the ground (beach sand) while the transverse cross member 24 rests upon the ground so as to balance the assembly in this upright position. The handle mechanism 34 serves the additional function of being a support strut, as shown in FIG. 3, by being releasably joinable to the transverse cross member 24 to maintain the transverse cross member 24 and the transverse cross piece 16 in spaced relation to form the chair shown in FIG. 3.

Thus, a very simple but highly versatile assembly has been provided, which may be easily fabricated of aluminum tubing for the frames 10 and 18, for example.

It will be appreciated that the presently preferred embodiment shown in the drawings may be modified to depart from the exact form shown in the drawings. The invention, accordingly, should be taken to be defined by the following claims.

I claim:

1. A combination carrier, chair, and lounge/table assembly comprising a first frame that includes two parallel side pieces joined by a transverse cross piece that extends out of the plane defined by said two parallel side pieces, a second frame that includes a pair of parallel side members joined by a transverse cross member that extends out of the plane defined by said two parallel side members, said parallel side members being pivotally connected to said parallel side pieces to permit said first and second frames to lie in one position adjacent one another, with the transverse cross piece and transverse cross member extending in opposed directions, and to be pivoted approximately 180° to a second position in which said transverse cross piece and transverse cross member extend in the same direction, including an axle transversely spanning said side pieces at a location remote from said transverse cross piece and carrying a pair of wheels at the ends thereof, in which said transverse cross member and said axle are positioned adjacent each other in said one position of said first and second frames, including a pair of skids mounted adjacent said wheels to permit said assembly to be pulled along the ground on said skids and said wheels, said skids having end means that support the assembly in upright position in which said side pieces and side members are perpendicular to the ground.

2. An assembly as in claim 1, in which said skid end means protrude so that they extend into the ground while said transverse cross member rests upon the ground to balance said assembly.

3. A combination carrier, chair, and lounge/table assembly comprising a first frame that includes two parallel side pieces joined by a transverse cross piece that extends out of the plane defined by said two parallel side pieces, a second frame that includes a pair of parallel side members joined by a transverse cross member that extends out of the plane defined by said two parallel side members, said parallel side members being pivotally connected to said parallel side pieces to permit said first and second frames to lie in one position adjacent one another, with the transverse cross piece and transverse cross member extending in opposed directions, and to be pivoted approximately 180° to a second position in which said transverse cross piece and transverse cross member extend in the same direction, including a pulling handle/support strut pivotally coupled to said transverse cross piece and having a handle portion that may be grasped to pull the assembly over the ground, said handle portion being releasably joinable to said transverse cross member to serve as a support strut holding said transverse cross piece and transverse cross member in spaced relation so that said first and second frames are oriented at an angle of approximately 120° with respect to each other.

4. An assembly as in claim 3, in which said transverse cross piece and transverse cross member are each defined by a generally U-shaped member joined at the open ends thereof to their respective side pieces and side members.

5. An assembly as in claim 3, including an axle transversely spanning said side pieces at a location remote from said transverse cross piece and carrying a pair of wheels at the ends thereof.

6. An assembly as in claim 5, in which said transverse cross member and said axle are positioned adjacent each other in said one position of said first and second frames.

7. An assembly as in claim 6, including a pair of skids mounted adjacent said wheels to permit said assembly to be pulled along the ground on said skids rather than said wheels, said skids having ends that support the assembly in upright position in which said side pieces and side members are perpendicular to the ground.

8. An assembly as in claim 7, in which said skid ends protrude so that they extend into the ground while said transverse cross member rests upon the ground to balance said assembly.

9. An assembly as in claim 5, including a pair of skids mounted adjacent said wheels to permit said assembly to be pulled along the ground on said skids and said wheels.

10. A combination carrier, chair, and lounge/table assembly comprising a first frame that includes two parallel side pieces joined at one end thereof by a transverse cross piece that extends out of the plane defined by said two parallel side pieces, a second frame that includes a pair of parallel side members joined at one end thereof by a transverse cross member that extends out of the plane defined by said two parallel side members, said parallel side member being pivotally connected to said parallel side pieces about an axis intermediate the ends of said first frame to permit said first and second frames to lie in one position adjacent one another, with the transverse cross piece and transverse cross member being on opposite sides of said axis and extending in opposed directions, and to be pivoted approximately 180° to a second position in which said transverse cross piece and transverse cross member are on the same side of said axis and extend in the same direction.

11. An assembly as in claim 10, in which said transverse cross piece and transverse cross member are each defined by a generally U-shaped member joined at the open ends thereof to their respective side pieces and side members.

12. An assembly as in claim 10, including a pulling handle/support strut pivotally coupled to said transverse cross piece and having a handle portion that may be grasped to pull the assembly over the ground, said handle portion being releasably joinable to said transverse cross member to serve as a support strut holding said transverse cross piece and transverse cross member in spaced relation so that said first and second frames are oriented at an angle of approximately 120° with respect to each other.

13. An assembly as in claim 10, and including an axle transversely spanning said side pieces at an end of said first frame opposite from said one end thereof that includes said transverse cross piece and carrying a pair of wheels at the ends thereof.

14. An assembly as in claim 13, including a pair of skids mounted adjacent said wheels to permit said assembly to be pulled along the ground on said skids and said wheels.

15. An assembly as in claim 13, in which said transverse cross member and said axle are positioned adjacent each other in said one position of said first and second frames.

16. An assembly as in claim 15, including a pair of skids mounted adjacent said wheels to permit said assembly to be pulled along the ground on said skids and said wheels, said skids having ends that support the assembly in upright position in which said side pieces and side members are perpendicular to the ground.

17. An assembly as in claim 16, in which said skid ends protrude so that they extend into the ground while said transverse cross member rests upon the ground to balance said assembly.

* * * * *